United States Patent Office

3,520,770
Patented July 14, 1970

3,520,770
POLYESTER COMPOSITE FILAMENTS AND
METHOD OF PRODUCING SAME
Takeo Shima, Yukiharu Asami, Yoshiaki Hori, Takanori
Urasaki, Masanori Masuda, and Takao Adachi,
Iwankuni-shi, Japan, assignors to Teijin Limited,
Osaka, Japan, a corporation of Japan
No Drawing. Filed July 5, 1966, Ser. No. 562,459
Claims priority, application Japan, July 6, 1965,
40/40,746; July 7, 1965, 40/40,686; Dec. 4, 1965,
40/74,504
Int. Cl. D01d 5/22; D02g 3/04
U.S. Cl. 161—173        16 Claims

ABSTRACT OF THE DISCLOSURE

Crimpable composite filaments wherein at least two different components of polymeric ethylene glycol terephthalate polyesters are arranged eccentrically and in intimate adherence to each other along the whole length of the filaments, at least one of the said components being a branched polymeric ethylene glycol terephthalate polyester chemically modified with at least one branching agent having 3 to 6 ester-forming functional groups and at least one of said components being an unbranched polymeric ethylene glycol terephthalate polyester.

---

This invention concerns crimpable composite filaments, and more particularly, crimpable composite filaments in which at least two different components of polymeric ethylene glycol terephthalate polyesters are arranged eccentrically and in intimate adherence to one another along the whole length of the filaments.

By the term "ethylene glycol terephthalate polyester" as used herein is meant a polyester at least 80 mole percent of which is ethylene glycol terephthalate. Continuous or staple filaments of ethylene glycol terephthalate polyester have excellent mechanical properties, resistance to chemicals and wash and wear property as compared with natural filaments and fibers, but there has been a demand on products in the form of woven or knitted fabrics having an excellent feel and warmth retentivity. If polyester filaments having bulkiness and good feel are developed, it is clear that they will be more utilisable.

For this purpose, attempts have been made in the past to give the filaments mechanical crimps by means of a stuffing box to improve their feel and warmth retentivity. But such crimps are liable to disappear even by the action of a slight stress, and hard to develop again even by re-heat treatment under relaxed condition. Therefore, such imparting of mechanical crimps only results in making the filaments spinnable, and does not lead to the improvement of feel and warmth retentivity of fabrics.

There has been proposed another method according to which two or more fiber-forming polymers as extruded simultaneously through a spinneret so that they may be arranged eccentrically at the cross-section of the filaments, and got together to form composite filaments wherein there is a difference in heat shrinkage among the components, and each component is shrinked by heat to a different degree whereby reversible helical crimps are developed.

Conventional composite filaments are mostly composed as a main constituent of viscose, acryl and polyamide, and as composite filaments composed of polyesters with each other, there has been only attempted a combination of its homopolymer and copolymer. The combination of polyester hitherto proposed as having difference in heat shrinkage pose a problem in the adhesiveness of components to one another, or are unsatisfactory in respect of the fastness and thermal stability of crimps even when there is an abundant amount of crimps. For this reason, the crimps of staple filaments obtained from such composite polyester filaments disappear or remarkably diminish during the step of spinning, or are contracted in a step of heat-setting, which unfavourably affects the feel of woven articles, and makes the woven articles liable to have a stiff feel.

This invention is intended to provide polyester composite filaments of good quality free from such defects.

In accordance with the present invention, there are provided crimpable composite filaments in which at least two different components of polymeric ethylene glycol terephthalate polyesters are arranged eccentrically and in intimate adherence to each other along the whole length of the filaments, at least one of the said component being a branched ethylene glycol terephthalate polyester modified chemically with at least one chain-branching agent having 3–6 ester-forming functional groups.

In order to produce chemically modified, branched ethylene glycol terephthalate polyester, one of the components of the composite filaments of the present invention, there is used at least one compound represented by the general formula A—(B)$_n$ (wherein B is an ester-forming functional group, $n$ is an integer of 3 to 6, and A is an organic residue) as a compound to form branched linkages or cross-linkages (hereinafter to be called a branching agent). Suitable as such a compound are pentaerythritol, dipentaerythritol, glycerol, sorbitol, trimethylolethane, trimethylolpropane, trimethylolbutane, trimethylolhexane, 1,3,5-trimethylolbenzene, 1,3,5-tripropylolbenzene, 1,3,5-tributylolbenzene, 1,2,6-hexanetriol 2,2,6,5-tetramethylolcyclohexanol, hemimellitic acid, trimellitic acid, trimesic acid, prehnitic acid, mellophanic acid, pyromellitic acid, mellitic acid, and functional derivatives of these, for instance, the esters with an aliphatic alcohol such as methyl, ethyl and propyl alcohols, or the aromatic phenol esters; or 5-hydroxyisophthalic acid, 4-hydroxyisophthalic acid, 2,5-dihydroxyisophthalic acid, 2,5-dihydroxyterephthalic acid and functional derivatives of these, for instance, the esters with an aliphatic alcohol such as methyl, ethyl and propyl alcohol or the aromatic phenol esters. Furthermore, there can be used polyfunctional organic compounds synthesised by the method of organic synthesis or compounds derived from the above-listed compounds.

The amount of any of these branching agents to be copolymerized with a branched ethylene glycol terephthalate polyester varies depending upon the type of ester-forming functional groups of the compound, but preferably it should be within the range shown by the following formulas. That is to say, the upper limit (mole percent) of the amount substantially copolymerized is $$9.6 \times \frac{1}{f(f-2)}$$

based on the total acid component, and the lower limit (mole percent) is $$0.8 \times \frac{1}{f(f-2)}$$

In the formula, $f$ shows the number of ester-forming functional groups of a branching agent, and is an integer of 3 to 6.

If, for instance, trimethylolethane having three ester-forming functional groups is used as a branching agent, it is preferable that it should be incorporated into the chain of branched polyester polymer in an amount of 0.267 to 3.2 mole percent based on the total acid component. On the other hand, when pentaerythritol having 4 ester-forming functional groups is used, it is preferable that it should be incorporated in an amount of 0.1 to 1.2 mole percent based on the total acid component. If the amount of the branching agent is below the said lower limit, composite filaments having satisfactory crimpability cannot be obtained. If terminating (or end-capping) agent as below mentioned is used together with the branching agent, it is possible to incorporate the branching agent in an amount exceeding the said upper limit, but if the amount of the branching agent is substantially larger than the said upper limit, it is remarkably difficult to melt spin branched polyesters.

The branching agent can be added to a polymerisation system before a polymerisation reaction to produce branched polyesters is completed, but it is preferable that it should be added to an ester interchange reaction system together with a starting ethylene glycol and a starting terephthalic acid component. As the amount of the branching agent to be incorporated into a polymer chain differs depending upon the type of the branching agent, that is, its volatility, steric hindrance of its functional groups, or conditions for the production of the polymer, it is necessary to choose an amount of addition and a method of addition in consideration of these points.

It is advantageous that branched polyester has a reduced viscosity ($\eta_{sp}/c$) of 0.64 to 0.99, preferably 0.64 to 0.88. The reduced viscosity as used in the present specification and claims is a reduced viscosity measured with respect to its 1.2% (wt.) orthochlorophenol solution at 35° C. Composite filaments obtained from a branched polyester having a reduced viscosity substantially lower than 0.64 are unsatisfactory in crimpability and poor in pilling resistance. On the other hand, a branched polyester having a reduced viscosity exceeding the said upper limit is hard to melt-spin irrespective of the spinning temperature.

Branched chain polyesters can be chemically modified with a combination of the said branching agent and at least one terminating agent having one ester-forming functional group. Such a terminating agent should preferably satisfy the following conditions:

(1) It should not be too much volatilised under polymerization conditions.
(2) It should have good thermal stability.
(3) It should have good solubility in polyester.
(4) It should not deteriorate the quality of polyester.

Specific examples of the terminating agent are o-benzoylbenzoic acid, benzoic acid, diphenyl-4-carboxylic acid, p-benzyloxybenzoic acid, p-phenylbenzoic acid, p-phenoxyethoxybenzoic acid, naphthalene - 2 - carboxylic acid, stearic acid, p-carboxyphenylbenzenesulphonate, diphenylsulphone-4-carboxylic acid, p-phenylphenol, o-chloro-p-phenylphenol, and functional derivatives of these, for instance, the esters with an aliphatic alcohol such as methyl, ethyl and propyl alcohols, or the phenol esters.

An amount of such a terminating agent having one ester-forming functional group to be incorporated into polyethylene terephthalate varies depending upon the amount of the said branching agent to be substantially copolymerised and the number of ester-forming functional group of the branching agent, but the amount (mmole percent) of this monofunctional compound to be substantially copolymerised, based on the total acid component, is confined within the range represented by the following formula in consideration of the amount of the branching agent to be substantially copolymerised and the number of the functional group:

$$N \leq M \leq Nf(f-2) \times 10 - \frac{fN(f-2)}{20}$$

(wherein N shows a mole percent of the branching agent to be substantially copolymerised based on the total acid compound and $f$ shows the number of ester-forming functional groups of the branching agent).

For example, when pentaerythritol having 4 ester-forming functional groups is copolymerised in an amount of 0.4 mole percent based on the total acid component of polyester, an amount of the monofunctional terminating agent, e.g. benzoic acid, to be substantially copolymerised within in polyester, is suitably 0.4 to 2.2 mole percent based on the total acid component.

The advantage of the conjoint use of at least one terminating agent is the prevention of such trouble as kneeling and yarn breakage at the time of spinning and the yielding of a product having uniform crimps. But the incorporation of the terminating agent in an amount exceeding the said upper limit should be avoided as it cannot lead to the achievement of satisfactory crimpability.

Branched polyesters modified with at least one chain branching agent and a suitable amount of at least one terminating agent have a terminal hydroxy group content lower than those modified by at least one chain branching agent alone, and is very much improved in the stability in the state of melt under atmospheric pressure.

As ethylene glycol terephthalate polyester, another component of the composite filaments of the present invention, there can be used, with good results, those ordinarily employed in the forming of fibers and filaments. The ethylene glycol terephthalate polyester may be polyethylene terephthalate or polyethylene terephthalate modified with a third component of an amount smaller than 20 mole percent. As the compound to be copolymerised in this copolymerised polyethylene terephthalate, there may be used at least one compound chosen from dibasic acids and oxy acids such as adipic acid, sebacic acid, isophthalic acid, diphenylsulphonedicarboxylic acid, diphenyldicarboxylic acid, naphthalene dicarboxylic acid and oxybenzoic acid. As the glycol, there can be used at least one compound chosen from (for example) trimethylene glycol, propylene glycol, cyclohexanedimethanol and neopentine glycol.

The composite filaments of this invention can be produced by melting at least two mutually different polymeric ethylene glycol terephthalate polyesters, at least one of which is the above-mentioned branched polyester, individually, and spinning the so melted polyesters in accordance with the method known per se to thereby form composite filaments composed of these polyesters and in which at least two components are arranged along the whole length of the filaments eccentrically and with intimate adherence to each other in a side-by-side or core-in-sheath relationship. It is preferable that each polyester component should be chosen so that there may not be so much difference in melt viscosity among components.

The composite filaments of the present invention develop satisfactory amount of crimps by removing the tension after drawing, without necessity for further treatment. This is supposed to be due to the fact that a branched chain polyester component is larger than other polyester component in the degree of recovery from the elongation in a drawing step. It has been found that in order to achieve good crimp properties, an undrawn composite filament should have a maximum draw ratio of 2.8 to 4.0. The maximum draw ratio means the maximum draw ratio at which the filament can be drawn at a rate of 100 m./sec. in water at 90° C. The following Table A shows an apparent crimping rate of a sample obtained by drawing an undrawn two-component composite filament (polyethylene terephthalate modified with pentaerythritol/polyethylene terephthalate) having a maximum draw ratio indicated and that of a sample under relaxed state for 20 minutes at 140°C.

TABLE A.—MAXIMUM DRAW RATIO AND CRIMPING

| Max. draw ratio | Apparent percentage crimp | |
|---|---|---|
| | Immediately after drawing | After heat-treatment for 20 minutes at 140° C. |
| 4.35 | 4.8 | 3.4 |
| 4.0 | 6.7 | 8.5 |
| 3.8 | 15.2 | 14.9 |
| 3.5 | 16.2 | 15.8 |
| 3.3 | 19.0 | 18.5 |
| 3.0 | 18.6 | 17.3 |
| 2.7 | 26.5 | [1] 0 |

[1] Solidified.

As seen from the Table A, an undrawn composite filament having a maximum draw ratio larger than about 4.0 produces poor crimps. This is believed to be due to a small difference of extension recovery between the component. It will be also understood that undrawn composite filaments having a maximum draw ratio below 2.8 develop remarkable crimps immediately after drawing, but the crimps are poor in thermal stability.

The maximum draw ratio of an undrawn composite filament depends upon the type of each component and spinning conditions. The following Table B exemplifies the maximum draw ratio of each single component filament which has been spun from each component under the same conditions as those for a two-component composite filament (polyethylene terephthalate modified with pentaerythritol/polyethylene terephthalate) having a maximum draw ratio indicated.

TABLE B.—MAXIMUM DRAW RATIO OF COMPOSITE FILAMENT AND ITS COMPONENTS

| Max. draw ratio of composite system | Max. draw ratio of polyethylene terephthalate component | Max. draw ratio of polyethylene terephthalate modified with pentaerythritol |
|---|---|---|
| 4.18 | 5.03 | 3.16 |
| 3.68 | 4.53 | 2.87 |
| .05 | 3.84 | 2.36 |

As seen from the Table B, the maximum draw ratio of the composite filament is considerably higher than that of the single component filament from the branched polyester component. It has been found that when the composite filament of this invention is drawn in order to develop crimps, it is preferable to draw it at a draw ratio within the range between the maximum draw ratio of the branched polyester component and the maximum draw ratio of the composite filament. If the draw ratio is substantially lower than the maximum draw ratio of the branched polyester component, the thermal stability of the obtained crimps is remarkably poor. It is very surprising that by effecting the drawing of the composite filaments of the present invention at a draw ratio substantially higher than the maximum draw ratio of one of its components (branched polyester), excellent crimps can be developed.

The drawing to develop crimps in the composite filament may be carried out at one stage or two stages or in stages more than this.

The crimped filaments so obtained can be heat-treated (at 60–180° C., preferably 70–150° C.) under a relaxed state to impart dimensional stability to the filaments. The filaments may be cut to staple lengths before or after the heat-treatment.

In accordance with another method for the production of crimped staple filaments from the composite filaments, the composite filaments are drawn, heat-treated in a relaxed state, given mechanical crimps by, for instance, a stuffing box, and cut to desired lengths. The staple filaments obtained by this method have crimps wherein two-dimensional crimps by mechanical crimp imparting and three-dimensional crimps by the present invention are combined with each other.

However, staple filaments having excellent spinnability are obtained by drawing the composite filaments of the present invention, imparting thereto two-dimensional crimps by a mechanical means, heat-treating them, and cutting them to desired staple lengths. The so obtained staple filaments have two-dimensional mechanical crimps and excellent spinnability. When woven fabrics made of such staple filaments are heat-treated, temporary, two-dimensional crimps disappear or diminish, and instead the three-dimensional crimps in accordance with the present invention appear in the fabrics.

Since the composite filaments of the present invention are composed of ethylene glycol terephthalates, the adhesiveness among components is exceedingly good and they cannot be divided into each component filaments without breaking the filaments. The drawn composite filaments possess excellent resistance to chemicals, wash-and-wear property and mechanical properties of polyethylene terephthalate filaments, and are superior in elasticity and elasticity recovery. The crimped composite filaments of the present invention have crimps resistant to mechanical stress and heat-stress such as heat-setting, and can give bulky fabrics having lively and soft feel and warmth retentivity.

METHOD OF MEASUREMENT

To measure crimps, tests are conducted with respect to the number of crimps, apparent percentage crimp, residual percentage crimp and crimp elasticity. In each of them, an average of the results of 30 tests was determined down to one place of decimal.

The number of crimps is expressed by the number of crimps existing over a distance of 25 mm. of a filament when it is subjected to an initial tension of 5 mg.

The percentage crimp is calculated by means of the following formula after measuring the length $l_1$ (when the said initial tension is applied) and the length $l_2$ (when the crimps are extended by giving a load of 50 mg. per denier for one minute):

$$\text{Percentage crimp} = \frac{l_2 - l_1}{l_2} \times 100$$

To measure the firmness of crimps, the residual percentage crimp and crimp elasticity are determined.

If the length of filament when subjected to the initial tension is $l_1$, the length when subjected to a load of 50 mg./d. for one minute after the removal of the initial load is $l_2$, and the length when subjected to an initial tension one minute after the removal of the load of 50 mg./d. is $l_3$, then the following formulas result.

$$\text{Residual percentage crimp (percent)} = \frac{l_2 - l_3}{l_2} \times 100$$

$$\text{Crimp elasticity (percent)} = \frac{l_2 - l_3}{l_2 - l_1} \times 100$$

Furthermore, to know the degree of fatigue of the filaments under a big load, the crimp fastness is measured. Filaments of the known apparent percentage crimp are subjected to a load of 1.5 g./d. for 30 minutes, and after removing the load, the percentage crimp is again determined. The crimp fastness is calculated in terms of percentage by dividing the determined percentage crimp by the original percentage crimp.

Example 1

Polyethylene terephthalate having a reduced viscosity of 0.88 and polyethylene terephthalate containing 0.42 mole percent of pentaerythritol and having a reduced viscosity of 0.74 were extruded through side-by-side type spinning nozzles in equal amounts at 290° C. to make composite filaments. The obtained undrawn composite filaments were drawn at 90° C. to 3.0 times their original length, and relaxed to form crimped filaments. The crimped filaments were heat-treated for 25 minutes in air at 145° C. under a relaxed state. The properties of the drawn crimped filament (I) the heat-set crimped filaments (II), the conventional polyethylene terephthalate filaments (III) crimped mechanically by means of a stuffing box having a reduced viscosity of 0.78, and crimped filaments (IV) obtained by spinning drawing and heat-treating polyethylene terephthalate having a reduced viscosity of 0.78 and 10 mole percent isophthalic acid copolymerised polyethylene terephthalate having a reduced viscosity of 0.80 under the same conditions as above mentioned are shown in the following Table 1.

TABLE 1

|  | Composite filament of present invention | | Crimped filament obtained by means of stuffing box (III) | Composite filaments of polyethylene terephthalate/ 10 mole percent isophthalic acid copolymerised polyethylene terephthalate (IV) |
|---|---|---|---|---|
|  | (I) | (II) | | |
| Apparent percentage crimp (percent) | 16.8 | 18.2 | 10.6 | 14.8 |
| Residual percentage crimp (percent) | 16.5 | 15.5 | 8.5 | 12.5 |
| Crimp elasticity (percent) | 98.2 | 92.3 | 81.2 | 85.1 |
| Number of crimps (per 25 mm.) | 10.5 | 13.1 | 11.6 | 10.1 |
| Crimp fastness (percent) | 88.5 | 28.3 | 0 | 2.1 |
| Number of crimps after heat-treatment at 180° C. under relaxed state (per 25 mm.) | 12.1 | 12.6 | 10.4 | 17.6 |
| Percentage shrinkage after heat-treatment at 180° C. under relaxed state (percent) | 10.9 | 1.3 | 20 | 8.0 |

Generally, woven fabrics, during their weaving stage, heat-set at a temperature of 180° C., but it is necessary at this time that a heat-shrinkage of the material at 180° C. should be less than 5 percent. If the material has a heat shrinkage higher than this, final woven fabrics come to have rigid feel. As the composite filaments of the present invention have but a little fluctuation in percentage shrinkage and the number of crimps, it is possible to obtain bulky woven fabrics having excellent feel from these composite filaments.

Examples 2–6

Polyethylene terephthalate and polyethylene terephthalate modified with 0.2 mole percent of pentaerythritol having varying reduced viscosities were melted at 290° C. The melt was spun with the use of side-by-side type spinning nozzles to form composite filaments. The time during which the melt resides in the spinning apparatus is on an average 20 minutes. In other words, most of the polymer leaves the spinning nozzle 20 minutes after the melting. The spinning nozzle has 60 holes with a diameter of 0.3 mm. The amount of the polymer extruded is 50 g., and the take-up rate of the filaments was 750 m./min. The obtained un-drawn filaments were drawn at the maximum draw ratio with the use of a pin at 90° C. The take-up speed after drawing was 100 m./min.

The said drawn filaments were heat-treated for 30 minutes at 150° C. in air under a relaxed state. Other condition for the production and the properties of the filaments are shown in the following Table 2.

TABLE 2

| Ex. | Reduced viscosity of polyethylene terephthalate containing pentaerythritol | Reduced viscosity polyethylene terephthalate | Temperature of spinneret (° C.) | Draw ratio | Percentage crimp (percent) | Tenacity (g./de.) | Elongation (percent) |
|---|---|---|---|---|---|---|---|
| 2 | 0.63 | 0.63 | 290 | 4.5 | 2.5 | 4.2 | 36 |
| 3 | 0.69 | 0.77 | 290 | 3.3 | 5.0 | 2.9 | 30 |
| 4 | 0.73 | 0.87 | 300 | 3.1 | 9.8 | 2.1 | 24 |
| 5 | 0.96 | 1.06 | 310 | 3.6 | 14.5 | 2.0 | 19 |
| 6 | 1.02 | 1.09 | Unspinable at any temperature | | | | |

No. 2 above does not develop crimps even after drawing and relaxing. Nos. 3 to 5 immediately develop crimps is maintained in a relaxed state after drawing.

Examples 7–8

Composite filaments (No. 7) of polyethylene terephthalate and 0.07 mole percent pentaerythritol modified polyethylene terephthalate both having a reduced viscosity of 0.85, and composite filaments (No. 8) of polyethylene terephthalate having a reduced viscosity of 0.88 and 0.1 mole percent pentaerythritol modified polyethylene terephthalate having a reduced viscosity of 0.85 were prepared under the same conditions as used in Example 2. Other condition for production and the properties of the obtained filaments are shown in the following Table 3.

TABLE 3

| Ex. | Temperature of spinneret (° C.) | Draw ratio | Percentage crimp (percent) | Tenacity (g./de.) | Elongation (percent) |
|---|---|---|---|---|---|
| 7 | 300 | 4.6 | 3.1 | 4.2 | 36 |
| 8 | 300 | 3.1 | 10.3 | 2.7 | 29 |

Example 9

Composite filaments (A) composed of polyethylene terephthalate having a reduced viscosity of 0.84 and 1.0% mole pentaerythritol modified polyethylene terephthalate having a reduced viscosity of 0.69, and composite filaments (B) composed of polyethylene terephthalate having a reduced viscosity of 1.02 and 1.3 mole percent pentaerythritol copolymerised polyethylene terephthalate were prepared under the conditions same as those employed in Example 2.

The filaments (A) were spinnable at a spinneret temperature of 300° C. and could be drawn at a draw ratio of 3.0. The filaments had a percentage crimp of 5.8%, a tenacity of 2.1 g./d. and an elongation of 23%. On the other hand, the filaments (B) could not be spun into filaments even if the spinning temperature was raised to 320° C. and the extruded filaments were solid rod-like and could not be wound up.

Example 10

Polyethylene terephthalate having a reduced viscosity of 0.89 and polyethylene terephthalate modified with 0.4 mole percent of pentaerythritol and having a reduced viscosity of 0.73 were individually melted, and the melts were together extruded through side-by-side type nozzles at a spinneret temperature of 295° C. into composite filaments. The nozzle had 60 holes with a diameter of 0.25 mm. The take-up speed for the spun filaments was 1000 m./min., and the total fineness of the filaments after the taking-up was 540 denier. The filaments were then drawn to 3.2 times the original length with the use of a hot pin at 80° C. Immediately, they were heat-treated under tension on a hot plate at 150° C. The obtained filaments already had a crimp percentage of 19%, but in order to give dimensional stability to them, they were further heat-treated under a relaxed state for 20 minutes in air at 145° C. As a result, the filaments came to have a percentage crimp of 15.5%, a tenacity of 2.6 g./de. and an elongation of 23%.

Example 11

Ten mole percent 4,4'-diphenyldicarboxylic acid copolymerised polyethylene terephthalate having a reduced viscosity of 0.84 and 1.5 mole percent trimethylolethane copolymerised polyethylene terephthalate having a reduced viscoisty of 0.73 were spun at 295° C. in the same manner as in Example 1, and the obtained undrawn filaments were drawn to 2.9 times its original length at 90° C. The drawn filaments were then heat-treated under relaxed state in air for 25 minutes at 150° C. The obtained crimped filaments had a percentage crimp of 13.5%, a residual percentage crimp of 12.8%, a crimp elasticity of 91.0%, the number of crimps of 9.8 per 25 mm., and a crimp fastness of 25%. After heat-treating them for 10 minutes at 180° C., they had the number of crimps of 8.9 per 25 mm. and a percentage shrinkage of 0.8%.

Example 12

Polyethylene terephthalate having a reduced viscosity of 0.84 and polyethylene terephthalate modified with 0.3 mole percent of pyromellitic acid and 0.5 mole percent of trimellitic acid and having a reduced viscosity of 0.75 were spun, drawn, and heat-treated under the same conditions as used in Example 1. The resulting crimped filaments had a percentage crimp of 14.8%, a residual percentage crimp of 13.5%, a crimp elasticity of 94.5%, the number of crimps of 10.2 per 25 mm., and a crimp fastness of 26.5%. When they were heat-treated in a dry air for 10 minutes at 180° C., they had the number of crimps of 10.0 per 25 mm., and a percentage shrinkage of 1.1%.

Example 13

Polyethylene terephthalate copolymerised with 5 mole percent of isophthalic acid and having a reduced viscosity of 0.89 and polyethylene terephthalate modified with 2.3 mole percent of 5-hydroxyisophthalic acid and having a reduced viscosity of 0.74 were spun, drawn, and heat-treated in the same manner as in Example 1. The obtained crimped filaments had a percentage crimp of 9.8%, a residual percentage crimp of 10.7%, a crimp easticity of 90.7%, the number of crimps of 9.5 per 25 mm., and a crimp fastness of 26.7%. After they were heat-treated for 10 minutes in a dry air at 180° C., they came to have the number of crimps of 9.2 per 25 mm. and a percentage shrinkage of 1.6%.

Example 14

An equal amount each of polyethylene terephthalate having a reduced viscosity of 0.85 and polyethylene terephthalate modified with 0.20 mole percent of pentaerythritol and 1.00 mole percent of diphenyl-4-carboxylic acid and having a reduced viscosity of 0.66 (an amount of terminal groups being 100 equivalents/$10^6$ gr.) was extruded through side-by-side type nozzles to make composite filaments. The obtained undrawn filaments were drawn to 3.0 times their original length at 90° C., and heat-treated in a relaxed state for 25 minutes in air at 145° C. whereby crimped filaments having the following properties were obtained.

TABLE 4

| | |
|---|---|
| Percentage crimp (percent) | 15.7 |
| Residual percentage crimp (percent) | 14.1 |
| Crimp elasticity (percent) | 90.3 |
| Number of crimps (per 25 mm.) | 12.3 |
| Crimp fastness (percent) | 27.5 |
| Number of crimps after heat-treatment in a relaxed stage at 180° C. (per 25 mm.) | 12.5 |
| Percentage shrinkage after heat-treatment in a relaxed stage at 180° C. (percent) | 1.5 |

In this example, the operability during spinning was excellent and kneeling did not take place within 48 hours after the start of the spinning.

Test pieces obtained by carrying out the spinning under the same conditions and taken out at certain time intervals were drawn and heat-treated in the manner as mentioned above. The obtained crimped filaments (20 lots) had a percentage crimp higher than 15.7. The average percentage crimp of the crimped filaments was 15.9 and the range of the percentage crimp was 2.0.

On the other hand, when a polymer containing no monofunctional compound was used, kneeling took place in 8 hours from the start of the spinning and the taking up of the filaments was impossible. Test pieces obtained by carrying out spinning for a long time under the same conditions and taken out at certain time intervals were drawn and heat-treated under the same conditions to form crimped filaments. When a monofunctional compound was not added, five out of twenty lots of the crimped filaments had a percentage crimp of less than 15.7. The average percentage crimp was 14.1 and the range of percentage crimp was 9.7.

Example 15

Polyethylene terephthalate modified with 5 mole percent of isophthalic acid and having a reduced viscosity of 0.75 and polyethylene terephthalate modified with 0.31 mole percent of pentaerythritol and 0.98 mole percent of p-benzyloxybenzoic acid and having a reduced viscosity of 0.65 (an amount of terminal groups being 118 equivalents/$10^6$ gr.) were spun at 295° C. under the conditions same as those used in Example 1 to make composite filaments. The obtained undrawn composite filaments were drawn to 3.5 times their original length at 90° C., and heated at 140° C. for 25 minutes in air under a relaxed condition. The so obtained crimped filaments had a percentage crimp of 14.6%, a residual percentage crimp of 13.0%, a crimp elasticity of 91.2%, the number of crimps of 11.5 per 25 mm., and a crimp fastness of 26.3%. When they were heated in dry air at 180° C. for 10 minutes, they came to have the number of crimps of 10.1 per 25 mm. and a percentage shrinkage of 1.6%.

Example 16

Polyethylene terephthalate copolymerised with 10 mole percent of 2,6-naphthalenedicarboxylic acid and having a reduced viscosity of 0.85 and polyethylene terephthalate and polyethylene terephthalate modified with 1.3 mole percent of 5-hydroxyisophthalic acid and 1.5 mole percent of alpha-naphthylacetic acid and having a reduced viscosity of 0.74 were spun at 295° C. under the conditions same as those in Example 1. The resulting undrawn composite filaments were drawn to 3.2 times their original length at 90° C. and heat-treated in air at 150° C. for 25 minutes under a relaxed condition. The obtained crimped filaments had a percentage crimp of 13.2%, a residual percentage crimp of 12.5%, a crimp elasticity of 93.1%, the number of crimps of 11.3 per 25 mm., and a crimp fastness of 29.9%. When they were heat-treated in dry air at 180° C. for 10 minutes, they came to have the number of crimps of 10.8 per 25 mm. and a percentage shrinkage of 0.9%.

What is claimed is:

1. Crimpable composite filaments wherein at least two different components of polymeric ethylene glycol terephthalate polyesters are arranged eccentrically and in intimate adherence to each other along the whole length of the filaments, at least one of the said components being a branched polymeric ethylene glycol terephthalate polyester chemically modified with at least one branching agent having 3 to 6 ester-forming functional groups and at least one of said components being an unbranched polymeric ethylene glycol terephthalate polyester.

2. The crimpable composite filaments according to claim 1 wherein the said branched polyester contains in its molecule the branching agent residue in an amount, based on the total acid component, of $$\frac{0.8}{f(f-2)} \text{ to } \frac{9.6}{f(f-2)}$$

mole percent (where $f$ represents the number of ester-forming functional groups in the branching agent, and is an integer of 3 to 6).

3. The crimpable composite filaments according to claim 1 wherein the said branched polyester has a reduced viscosity of 0.64 to 0.99 before spinning.

4. Crimpable composite filaments wherein at least two different components of polymeric ethylene glycol terephthalate polyesters are arranged eccentrically and in intimate adherence to each other along the whole length of the filaments, at least one of the said components being a branched polymeric ethylene glycol terephthalate polyester chemically modified with at least one branching agent having 3 to 6 ester-forming functional groups and at least one of said components being an unbranched polymeric ethylene glycol terephthalate polyester, the said branched polyester containing in its molecule the branching agent residue in an amount, based on the total acid component, of $$\frac{0.8}{f(f-2)} \text{ to } \frac{9.6}{f(f-2)}$$

mole percent (wherein $f$ represents the number of ester-forming functional groups in the branching agent, and is an integer of 3 to 6) and having a reduced viscosity of 0.64 to 0.99 before spinning.

5. The composite filaments according to claim 4 which has a maximum draw ratio of 2.8 to 4.0

6. Crimpable composite filaments wherein at least two different components of polymeric ethylene glycol terephthalate polyesters are arranged eccentrically and in intimate adherence to each other along the whole length of the filaments, at least one of the said components being a branched polymeric ethylene glycol terephthalate polyester chemically modified with at least one branching agent having 3 to 6 ester-forming functional groups and at least one terminating agent having one ester-forming functional group, the amount of the terminating agent contained in the molecule of the said branched polyester being in the range expressed by the formula $$N \leq M \leq Nf(f-2) \times 10^{-\frac{fN(f-2)}{20}}$$

(where M represents a mole percent, based on the total acid component, of the terminating agent residue contained in the molecule of the said branched polyester, N represents a mole percent, based on the total acid component, of the branching agent residue contained in the molecule of the branched polyester, and $f$ represents the number of the ester-forming functional groups of the said branching agent and is an integer of 3 to 6) and at least one of said components being an unbranched polymeric ethylene glycol terephthalate polyester.

7. The composite filaments according to claim 6 wherein the said branched polyester contains in its molecule the branching agent residue in an amount, based on the total acid component, of $$\frac{0.8}{f(f-2)} \text{ to } \frac{9.6}{f(f-2)}$$

mole percent in the molecule (where $f$ shows the number of ester-forming functional groups of the branching agent and is an integer of 3 to 6).

8. The composite filaments according to claim 6 wherein the said branched polyester has a reduced viscosity of 0.64 to 0.99 before spinning.

9. The composite filaments according to claim 6 wherein the branched polyester contains in its molecule the branching agent residue in an amount, based on the total acid component, of $$\frac{0.8}{f(f-2)} \text{ to } \frac{9.6}{f(f-2)}$$

mole percent (where $f$ represents the number of ester-forming functional groups of the branching agent and is an integer of 3 to 6), and has a reduced viscosity of 0.64 to 0.99 before spinning.

10. The composite filaments according to claim 6 which has a maximum draw ratio of 2.8 to 4.0.

11. Crimpable composite filaments wherein at least two different components of polymeric ethylene glycol terephthalate polyester are arranged eccentrically and in intimate adherence to each other along the whole length of the filaments, at least one of the said components being a branched polymeric ethylene glycol terephthalate polyester chemically modified with 0.1 to 1.2 mole percent, based on the total acid component, of pentaerythritol, the said branched polyester having a reduced viscosity of 0.64 to 0.99 before spinning and at least one of said components being an unbranched polymeric ethylene glycol terephthalate polyester.

12. The composite filaments according to claim 11 which has a maximum draw ratio of 2.8 to 4.0.

13. Crimpable composite filaments wherein at least two different components of polymeric ethylene glycol terephthalate polyester are arranged eccentrically and in intimate adherence to one another along the whole length of the filaments, at least one of the said components being a branched polymeric ethylene glycol terephthalate polyester modified chemically with pentaerythritol and at least one terminating agent having one ester-forming functional group, the amount of pentaerythritol contained in the branched polyester being in the range expressed by the formula:

$$0.1 \leq N \leq 1.2$$

(wherein N is the mole percent, based on the total acid component, of a residue of pentaerythritol contained in the molecule of the said branched polyester), the amount of the terminating agent being in the range expressed by the formula:

$$\frac{N}{[M]} \leq M \leq 8N \times 10^{-0.4N}$$

wherein M represents a mole percent, based on the total acid component, of the terminating agent residue contained in the molecular of the said branched polyester and N has the same meaning as defined above, the said branched polyester having a reduced viscosity of 0.64 to 0.99 before spinning and at least one of said components being an unbranched polymeric ethylene glycol terephthalate polyester.

14. The composite filaments of claim 13 which has a maximum draw ratio of 2.8 to 4.0.

15. A drawn, crimped composite filament comprising at least two different components of polymeric ethylene glycol terephthalate polyesters arranged eccentrically and in intimate adherence to each other along the whole length of the filaments, at least one of the said components being a branched polymeric ethylene glycol terephthalate polyester chemically modified with at least one branching agent having 3 to 6 ester-forming functional groups and at least one of said components being an unbranched polymeric ethylene glycol terephthalate polyester.

16. A method of manufacturing crimped composite filaments which comprises melting at least two different ethylene glycol terephthalate polyesters individually, extruding the melt of said polyesters through side-by-side type spinning nozzles into composite filaments in which at least two of the said polyester components are arranged eccentrically and in intimate adherence to each other along the whole length of the filaments, and drawing the composite filaments, characterized in that at least one of the said components is a branched ethylene glycol terephthalate polyester chemically modified with at least one branching agent having 3 to 6 ester-forming functional groups and at least one of said components being an unbranched polymeric ethylene glycol terephthalate polyester, and that the said drawing operation is carried out at a draw ratio larger than the maximum draw ratio of the said branched polyester component.

References Cited

UNITED STATES PATENTS

| | | | |
|---|---|---|---|
| 2,895,946 | 7/1959 | Huffman | 260—75 |
| 2,915,486 | 12/1959 | Shelley | 260—860 |
| 2,936,296 | 5/1960 | Precopio et al. | 260—75 |
| 3,033,824 | 5/1962 | Huffman | 260—75 |
| 3,039,524 | 6/1962 | Belck et al. | 161—173 |
| 3,345,429 | 10/1967 | Sattler | 260—860 |
| 3,381,058 | 4/1968 | Caldwell | 260—75 |

ROBERT F. BURNETT, Primary Examiner

R. O. LINKER, Jr., Assistant Examiner

U.S. Cl. X.R.

264—168, 171